US009542177B1

(12) United States Patent
Johansson et al.

(10) Patent No.: US 9,542,177 B1
(45) Date of Patent: Jan. 10, 2017

(54) PEER CONFIGURATION ANALYSIS AND ENFORCEMENT

(71) Applicant: Amazon Technologies, Inc., Reno, NV (US)

(72) Inventors: Jesper M. Johansson, Redmond, WA (US); Charles Craig Gehre, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 563 days.

(21) Appl. No.: 13/663,899

(22) Filed: Oct. 30, 2012

(51) Int. Cl.
*G06F 9/44* (2006.01)
*H04L 29/06* (2006.01)
*G06F 17/22* (2006.01)

(52) U.S. Cl.
CPC .............. *G06F 8/71* (2013.01); *G06F 17/2288* (2013.01); *H04L 63/0272* (2013.01)

(58) Field of Classification Search
None
See application file for complete search history.

(56) References Cited

U.S. PATENT DOCUMENTS

| | | | | |
|---|---|---|---|---|
| 6,098,098 A * | 8/2000 | Sandahl et al. | ............... | 709/221 |
| 7,239,650 B2 * | 7/2007 | Rakib et al. | ................... | 370/480 |
| 7,441,049 B2 * | 10/2008 | Chasman | .......... | G06F 17/30578 |
| | | | | 707/E17.005 |
| 7,617,289 B2 * | 11/2009 | Srinivasan et al. | ........... | 709/209 |
| 7,752,615 B1 * | 7/2010 | Perry et al. | .................... | 717/168 |
| 7,966,391 B2 * | 6/2011 | Anderson et al. | ............ | 709/223 |
| 7,987,152 B1 * | 7/2011 | Gadir | ............................ | 707/602 |
| 8,037,024 B1 * | 10/2011 | Bozkaya | ........... | G06F 17/30581 |
| | | | | 707/637 |
| 8,234,414 B2 * | 7/2012 | Issa | .................... | G06F 17/30902 |
| | | | | 709/203 |
| 8,473,564 B2 * | 6/2013 | Holt | .......................... | G06F 9/52 |
| | | | | 709/212 |
| 8,583,769 B1 * | 11/2013 | Peters et al. | ................... | 709/221 |
| 8,806,043 B1 * | 8/2014 | Duraisamy et al. | .......... | 709/229 |
| 2001/0042073 A1 * | 11/2001 | Saether et al. | ................ | 707/203 |
| 2003/0074426 A1 * | 4/2003 | Dervin | ....................... | G06F 8/60 |
| | | | | 709/220 |
| 2003/0120433 A1 * | 6/2003 | Yokota | ..................... | C12Q 1/68 |
| | | | | 702/20 |
| 2003/0195931 A1 * | 10/2003 | Dauger | ................... | H04L 41/18 |
| | | | | 709/205 |

(Continued)

*Primary Examiner* — Ninos Donabed
(74) *Attorney, Agent, or Firm* — Athorus, PLLC

(57) ABSTRACT

The states or configurations of peer hosts within a host class may be analyzed and enforced by comparing records of the respective systems' states or configurations to one another and taking steps to address any inconsistencies between the records. In such a manner, the respective systems within the host class may identify, analyze and/or correct any changes in states or configurations of any of the systems, which may have been caused by a malfunction or security breach. The configurations may include one or more of a set of data, a version of a software application, a level of permission, a particular operational setting or any other element of operation. The hosts may be defined as peers based on a common location or a common function of each of the systems, or on any other basis, and the records may include any relevant data relating to the states or configurations of each of the systems.

26 Claims, 9 Drawing Sheets

(56) References Cited

U.S. PATENT DOCUMENTS

| | | | |
|---|---|---|---|
| 2004/0110209 A1* | 6/2004 | Yokota | C12Q 1/6809 435/6.11 |
| 2004/0205401 A1* | 10/2004 | Froehlich | G06F 8/67 714/28 |
| 2005/0267951 A1* | 12/2005 | Joshi | G06F 8/65 709/220 |
| 2006/0080506 A1* | 4/2006 | Rajamony | G06F 12/0813 711/119 |
| 2006/0161460 A1* | 7/2006 | Smitherman et al. | 705/3 |
| 2006/0161516 A1* | 7/2006 | Clarke et al. | 707/2 |
| 2007/0005662 A1* | 1/2007 | Bankston et al. | 707/201 |
| 2007/0180075 A1* | 8/2007 | Chasman et al. | 709/223 |
| 2008/0133479 A1* | 6/2008 | Zelevinsky | G06F 17/3071 |
| 2008/0172463 A1* | 7/2008 | Qin et al. | 709/204 |
| 2008/0215760 A1* | 9/2008 | Song et al. | 709/248 |
| 2009/0193149 A1* | 7/2009 | Khosravy | 709/248 |
| 2010/0049922 A1* | 2/2010 | Aronovich | G06F 9/524 711/147 |
| 2010/0094973 A1* | 4/2010 | Zuckerman et al. | 709/219 |
| 2010/0169446 A1* | 7/2010 | Linden et al. | 709/206 |
| 2011/0122997 A1* | 5/2011 | Lu | A61N 5/1031 378/65 |
| 2011/0131301 A1* | 6/2011 | Klein et al. | 709/220 |
| 2011/0289493 A1* | 11/2011 | Keefe | G06F 8/65 717/168 |
| 2011/0307444 A1* | 12/2011 | Cox et al. | 707/625 |
| 2012/0011495 A1* | 1/2012 | Khuu | G06F 17/30575 717/170 |
| 2012/0022841 A1* | 1/2012 | Appleyard | G06F 17/12 703/2 |
| 2012/0096250 A1* | 4/2012 | Aloni | G06F 8/67 713/2 |
| 2013/0036090 A1* | 2/2013 | Akiyama | G06F 17/30578 707/624 |
| 2013/0036092 A1* | 2/2013 | Lafont et al. | 707/634 |

\* cited by examiner

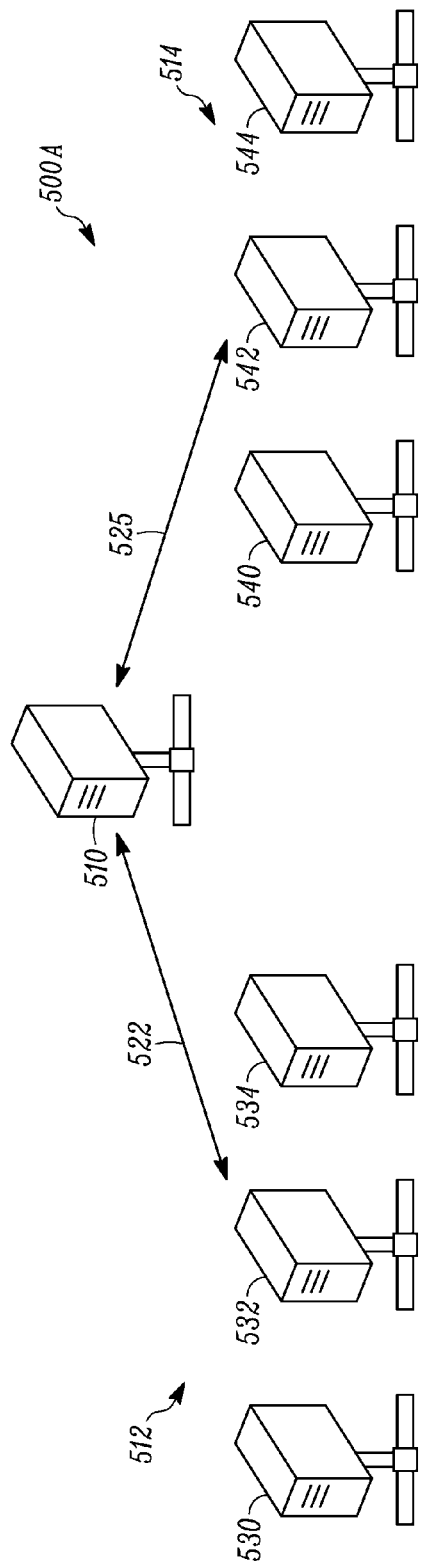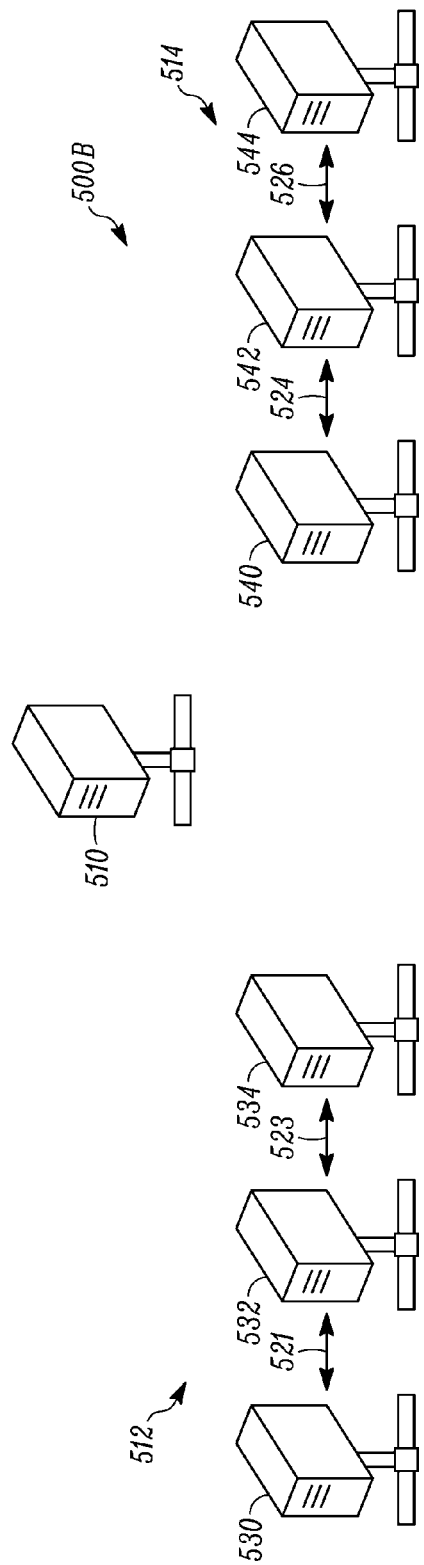

PEER CONFIGURATION ANALYSIS AND ENFORCEMENT

BACKGROUND

Frequently, a plurality of distributed computer systems (or hosts) may be clustered or grouped together on any basis, such as where each of the systems is in a common location or is dedicated to performing a common function. For example, a number of servers may be clustered to support a particular web site (such as a web site hosted by an online marketplace), in order to ensure the reliability and dependability of any particular functions to be performed by the web site. Additionally, a number of scanning machines or devices may be used to confirm the arrival of large numbers of goods at a warehouse or shipping facility, while a collection of servers may be used to house and control the sending and receipt of electronic mail at an organization's various satellite offices.

Where computer systems are clustered or grouped together for any reason, it is usually very important to ensure that each of the computer systems in the cluster or group is operating in the same state or the same configuration, i.e., to ensure that each of the systems features the same core operating element (such as the same set of data, version of a software application, level of permissions or particular operational setting) as each of its peers. Various problems may ensue if one or more systems of a cluster or group operates in a different state or a different configuration from the other systems in the cluster or group. For example, if some of the hosts in a networked system operate using a different version of a software application (i.e., an older or less advanced version) than others, then the networked system itself is less than fully versatile, and certain instructions or messages may be handled by only a limited number of the hosts in the networked system. Moreover, where a state or configuration of one or more of the hosts in a networked system has changed for any reason (i.e., due to a fault or security breach at one or more of the respective hosts), such a change is difficult to identify or diagnose unless or until a discrepancy in the host's operations is detected through normal operations.

Determining whether a plurality of computer systems is operating in the same state or configuration, and enforcing a common state or configuration among a plurality of computer systems, are usually challenging tasks. Although the configurations of a plurality of systems within a particular fleet or class may be determined and modified as necessary through tooling processes, such processes require defining the state or configuration based on a known, verified master, and comparing each of the respective systems against the master at a predetermined time, in series in a centrally managed manner. Additionally, until the states or configurations of each of the respective systems within a fleet or class is reviewed in such a tooling process and modified or upgraded, as necessary, there is no way to know whether a state or a configuration of one of the respective systems within the fleet or class has changed. Unless tooling processes are persistently run on each of the respective systems, a change in a state or a configuration—which may have occurred due to a fault or security breach, or other potentially serious adverse conditions—may last for an extended period time, unbeknownst to the owners or operators of the plurality of systems.

BRIEF DESCRIPTION OF THE DRAWINGS

FIGS. 5A and 5B are networked systems for analyzing and enforcing peer configurations, in accordance with embodiments of the present disclosure.

DETAILED DESCRIPTION

As is set forth in greater detail below, the present disclosure is directed to analyzing and enforcing configurations among the various peer systems within a particular fleet or class. Specifically, the present disclosure describes systems and methods for determining and/or maintaining consistent or equivalent configurations among groupings of computer systems (or hosts), in which a first computer system compares a summary, record or other description of its current configuration to that of a second computer system that is expressly defined as one of its peers. Both the first computer system that prompts the comparison, and the second computer system that provides a summary, record or other description of its current configuration in response to a prompt, may be selected at random or on any basis. If the descriptions are not consistent or equivalent with one another, various steps may be taken to address the inconsistency or inequivalence, including an execution or implementation of a change to one or more aspects of the configurations of one or more of the computer systems.

Moreover, comparisons of such configuration summaries, records or descriptions may occur at any time, such as at a predetermined time that may be defined in a schedule, at a random time, or upon the occurrence of a particular event, such as upon a detected change in the configuration of one or more of the peers. For example, a component in a networked system that detects a change in its own configuration, or a change in a configuration of one of its peers, may initiate a comparison of a summary, record or description of a configuration of the pertinent system against a similar summary, record or description of a known standard configuration by transmitting, or "pushing," data regarding its own configuration or that of the affected peer to another component and requesting a comparison thereof against a known standard configuration. Alternatively, such a component may initiate a comparison by requesting and receiving, or "pulling," data regarding a known standard configuration and comparing such data to data regarding its own configuration.

Figure 1:
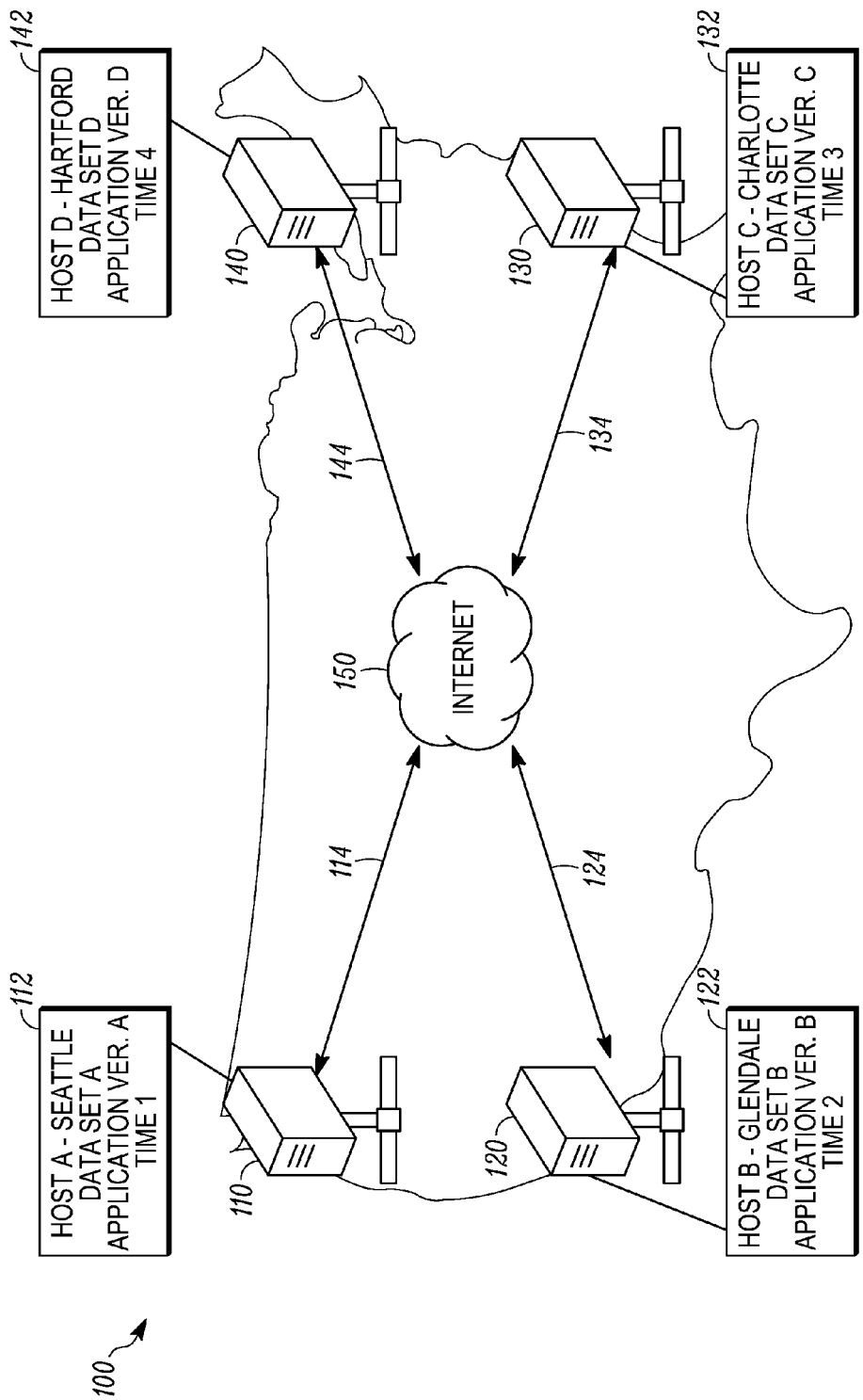
FIG. 1 is a block diagram of a networked system for analyzing and enforcing peer configurations, in accordance with embodiments of the present disclosure.

One embodiment of a networked system 100 that may operate according to the systems and methods of the present disclosure is shown in FIG. 1. Referring to FIG. 1, the networked system 100 includes servers 110, 120, 130, 140. The servers 110, 120, 130, 140 are located in disparate locations that are distributed across the United States (viz., in Seattle, Glendale, Charlotte and Hartford), and are connected to one another across a network 150, such as the Internet. Descriptions of the respective data sets and versions of applications operating on each of the servers 110, 120, 130, 140, at particular times, are shown in the summaries 112, 122, 132, 142. For example, server 110 is located in Seattle and contained data set A and version A of a certain software application at time 1. Similarly, server 120 is located in Glendale and contained data set B and version B of the application at time 2, and server 130 is located in Charlotte and contained data set C and version C of the application at time 3, while server 140 is located in Hartford and contained data set D and version D of the application at time 4. Additionally, the servers 110, 120, 130, 140 may be connected to or otherwise communicate with one another through the network 150 by sending and receiving digital data, as indicated by lines 114, 124, 134, 144.

According to the systems and methods of the present disclosure, one or more components of a networked system, such as the servers 110, 120, 130, 140 of the networked system 100 shown in FIG. 1, may analyze and enforce the states or configurations of one or more other components of the networked system by comparing a summary of its own state or configuration to a summary of a state of configuration of one or more of the other components in the networked system. If the summaries are consistent or equivalent with one another, then the respective components may be deemed to be in the same state or configuration. If the summaries are inconsistent or inequivalent with one another, then any number of remedial steps may be taken to address the inconsistency or the inequivalence, including sounding an alarm or transmitting one or more messages, further evaluating the states or configurations of the respective components, or obtaining and executing a solution to the inconsistency between the states or configurations (i.e., a specific change to the states or configurations of one or more of the components). In such a manner, the systems and methods disclosed herein may determine the configurations of each of a plurality of hosts in a networked system, and may ensure that the plurality of hosts operates according to a common or desired state or configuration, without requiring a central "master" to conduct or orchestrate the comparisons and confirmations of the respective configurations of each of the other hosts in the networked system. The systems and methods disclosed herein may be used in or with any application that requires a plurality of discrete computer systems or components to be integrated with one another and to operate in the same state or configuration, such as a group of local devices dedicated to performing the same or similar functions, a distributed database or data processing system, or a series of server-related components that may be configured for hosting one or more web sites.

Likewise, the systems and methods of the present disclosure may be used to distribute an update to a desired state or configuration among each of a plurality of hosts in a networked system. For example, where a configuration of one of the hosts in a host class is updated or upgraded (i.e., where a new operating system is launched on one of the hosts), and where that host is designated as a configuration standard, either singly or jointly with another host, a summary of the configuration of that host may be compared to summaries of the configurations of each of the other hosts in the host class. If any of the other hosts within the host class is not operating in the updated or upgraded configuration (i.e., if any of the hosts has not received an upgrade to the new operating system), then the configuration summaries will be deemed to be inconsistent or inequivalent with one another, and a change to the configuration of the substandard host or hosts may be executed manually or automatically, i.e., "peered out" to the peers of the host that is operating in the updated or upgraded configuration.

Conversely, the systems and methods of the present disclosure may be used to "roll back" the state or configuration of one or more hosts in a network system, such as by reverting to a particular known state or configuration. For example, where a change to a configuration of at least one component in a system is known to be faulted (e.g., where a software patch or upgrade made to a component causes problems with one or more aspects of the component), the systems and methods of the present disclosure may compare a summary of the configurations of each of the components in the system to a previously established standard (e.g., a configuration that may be known to be fault-free) and transmit instructions to revert the configurations of the components of the system that have received the configuration change to the previously established standard. Similarly, the systems and methods of the present disclosure may also revert the configurations of the components of a system to a configuration established by a particular entity or individual. Furthermore, once a change to a configuration of a component has been implemented, the systems and methods of the present disclosure may confirm the efficacy of the change by comparing the configuration of the component to a known standard, and by taking steps to address any discrepancies that may be identified.

The various hosts (or components) of a networked system may be adapted to summarize their current states or configurations according to a certain protocol or format, and to compare respective summaries of their current states or configurations to those of their peers within a fleet or class of such components. Peers may be defined based on any commonality between two or more hosts. For example, a group of hosts may be defined as peers with one another where the hosts are located in a common location or are dedicated to performing a common function, or on any logistic, functional or other basis. Peers may also be selected from a list, which may be subject to change. Moreover, a set of peers may be determined nearly instantaneously, such as at the time at which a comparison of states or configurations is set to occur. For example, a system that intends to originate a comparison of states or configurations may broadcast (or multicast) a message to one or more related or associated systems, in order to determine which (or how many) of the systems are its peers, before randomly selecting one or more of the responding systems for a comparison of states or configurations. Additionally, the association of hosts as peers is not exclusive, i.e., a host may have two other hosts as its peers, but those two hosts need not be peers of one another.

A comparison of states or configurations of hosts in a networked system may be initiated on any basis and for any reason, and the hosts for which the states or configurations are to be compared may be selected according to a schedule, at random, or on any other basis. For example, a host may be designated as having a standard configuration based on the extent of a data set stored thereon, a particular version of an application operating thereon, or a time or date of a previous upgrade to the host's configuration. Furthermore, where one host detects a discrepancy in the state or configuration or other abnormality of another host, the host that detected the discrepancy may recommend or initiate one or more processes to evaluate the status of the state or configuration of the other host, or to otherwise address the abnormality.

According to one embodiment of the present disclosure, a state university with one main campus and seven regional campuses maintains a computer server at each campus for storing documents and records, and for sending and receiving electronic mail. The servers are connected to one another directly through fiber optic cabling and also through the Internet. Each day, one of the servers is selected at random to analyze and enforce the configurations of the other seven servers, in accordance with the systems and methods of the present disclosure. First, the randomly selected server will transmit an Extensible Markup Language ("XML") message to each of the other seven servers, and request that the servers prepare and furnish detailed summaries of their current operating systems and configurations. Next, the randomly selected server will then compare the detailed summary of each of the other servers to a detailed summary of its own current operating system and configuration. If the comparison of the summaries indicates that the operating system and configuration of a server are consistent with the operating system and configuration of the randomly selected server, then the randomly selected server will transmit a similar XML message to another of the seven servers, until the randomly selected server has analyzed and compared the operating systems and configurations of each of the other seven servers to its own. If any of the comparisons of the summaries indicates that one or more of the operating systems and configurations are not consistent with those of the randomly selected server, an alarm may sound, and an in-depth analysis of the potential causes of the inconsistency and/or defect in an offending server's operating system and configuration may be undertaken. In such a manner, each of the various servers may police the respective states of the other various servers on a random basis and at a regularly scheduled time, without the use of a centralized host or "master" that is dedicated to performing such functions.

According to yet embodiment of the present disclosure, a sports arena maintains a fleet of hand-held scanners to be used by its employees when admitting fans to a sporting event held at the arena. Each of the scanners includes a laser scanner that emits a laser beam onto a bar code and confirms the validity of the ticket based on the intensity of the light reflected back from the bar code. Additionally, because the architectural features of the sports arena include several areas having thick layers of concrete and steel, the scanners also include short-range communication hardware and software for communicating with one another according to a particular protocol (e.g., Bluetooth®), rather than with a centralized host, which may not be directly accessible based on the geometry of the arena. As fans are queued up to enter the arena, one of the scanners is loaded with a registry key and data set regarding the tickets that have been issued to the sporting event and instructed to locate and pair with another scanner in its vicinity, and to compare its state with the other scanner. Once the chosen scanner has located another scanner in its vicinity, the chosen scanner requests that the other scanner provide it with a metadata description of its current configuration, including an identifier regarding its current registry key and ticketing data set. The chosen scanner then compares the metadata description of the located scanner's configuration to a similar metadata description of its own configuration. If the scanners' metadata descriptions are not consistent with one another, then the chosen scanner uploads a patch including the new registry key and/or data set to the located scanner. Once the located scanner has downloaded the patch, or if the two scanners' metadata descriptions are consistent with one another, then each of the two scanners then independently searches for other scanners, and attempts to confirm the respective configurations of each of the scanners that it locates. In such a manner, the fleet of scanners may police itself as to the consistency of the configurations of each of the respective scanners, and ensure that each of the respective scanners is operating according to a common configuration.

Accordingly, the systems and methods of the present disclosure may permit the owners or operators of a cluster or group of peer computer systems to establish procedures and protocols for internally analyzing and enforcing the respective states and/or configurations of each of the peers in the cluster or group. In such a manner, a consistent or equivalent configuration among the peers may be maintained, and the operability and security of each of the respective peers may be monitored, without the use of a centralized host or reporting structure. The systems and methods of the present disclosure thereby enhance the reliability of distributed, networked systems.

The computers, servers, devices and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

As is set forth above, it is usually preferable for computer systems that are clustered or grouped together for any reason, which are commonly referred to as "peers," to operate in the same state or the same configuration. The term "configuration" generally refers to any condition, state or setting that is desired to be maintained on each of the respective aspects of a system or network, including the technical specifications of the system or network, which may refer to hardware components, software modules and/or a combination of hardware components or software modules, as well as sets of data associated with the system or network. For example, the term configuration may refer to the necessary hardware or software that may be required to operate a particular application or to perform a desired function, i.e., a specific arrangement of hardware and software details in terms of devices attached, capacity or capability. The term configuration may also refer to the various links or nodes of a network, i.e., the topology of the network. The term configuration may also refer to a status of a database or other data store, such as one or more variables (e.g., a checksum) indicative of such a status, as well as any particular setting, system condition, permission status or other operational factor, including a registry key or registry value.

According to the systems and methods of the present disclosure, a system's configuration may be analyzed and enforced by comparing a set of data regarding the configuration of the system (i.e., a summary, record or other metadata-based description of the hardware and/or software residing on or accessible to the system) to a similar set of data regarding the configuration of one of its peers. The sets of data may be compiled according to a schedule or upon request, and each of the sets of data may be assigned a time stamp or other indicator of the time and/or date at which the set was compiled. For example, an originating system may transmit a message to at least one receiving system, and request that the receiving systems provide the originating system with a summary or record of the current configuration of the receiving systems (e.g., a statement or description of the respective systems' configurations and a time stamp indicating the time and date on which the statement or description was prepared), while also generating a similar summary or record of its own, current configuration. The originating system may then compare the summaries or records to determine whether the configurations of the respective systems were consistent with one another at the time of the request. Alternatively, one or more of the receiving systems may perform such a comparison. If the summaries or records were, in fact, consistent, then the peer systems may be understood to have been operating in the same state configuration. Such a comparison may occur spontaneously (i.e., at randomly selected times), according to a schedule, or upon the occurrence of a specific event. Additionally, the identities of the originating system and/or the receiving system in such a comparison may also be determined spontaneously, according to a schedule, or upon the occurrence of an event.

Additionally, the contents of the sets of data (e.g., the specific summaries, records or descriptions of configurations) to be compared in accordance with the present disclosure may be defined at any time and on any basis, with respect to the particular functions of each of the systems. According to one embodiment, the sets of data contain individual settings of one or more designated systems. According to another embodiment, the sets of data may represent or indicate an aggregate configuration regarding multiple aspects of a system's preferred operating condition, i.e., a configuration in which a host would ideally operate. For example, where a networked system includes multiple hosts, each operating a respective version of a software application, data set and permission level, an aggregate configuration may be defined based on the most up-to-date version of the software application, the most up-to-date data set and the most up-to-date permission level. Once the aggregate configuration has been defined, a summary of the aggregate configuration may be compared to summaries of the configurations of each of the hosts in the networked system and, where necessary, changes to the respective hosts' configurations may be made. In such a manner, the configurations of each of the hosts in a network system may be compared to a summary of an ideal configuration, even if none of the hosts in the actually operated in such a configuration at the time of the comparison.

Moreover, the sets of data may also include specific information, settings, metadata or any other content, and may be recorded or represented in any type of language. For example, where the configurations of two electronic mail servers are to be evaluated, summaries, records or descriptions of the respective SENDMAIL or SMTP settings of each of the servers may be compared. The sets of data may be determined based on the particular applications or functions of the components within a host class for which the configurations are to be compared, and may take the form of a cryptographic key or other security-dependent parameter. The sets of data may also identify a pertinent set of source code or any other feature relating to a system's configuration. Furthermore, the sets of data to be compared may consist of a single file, or a suite of multiple files, in accordance with the present disclosure, and the level of granularity or specificity of the sets of data may be determined by the particular function of the respective systems or on any other basis.

Two or more computer systems may be defined as "peers" on any basis and for any reason. For example, systems may be deemed peers if they are dedicated to performing the same or similar functions, or if they are physically located in close proximity to one another. Additionally, a set of peers may be defined at random, in a logical order, or by simply subdividing a larger set of systems into smaller subsets, wherein each of the systems in a subset are deemed to be peers. For example, as a series of systems are brought online, they may be associated with one another or defined as peers based on the time at which they were brought online, or on any other basis.

Any number of actions may be taken when two systems are deemed to have consistent or equivalent (or inconsistent or inequivalent) configurations, including a change to one or more of the systems' configurations that remedies or otherwise addresses any inconsistency or inequivalence. For example, where two systems are deemed to have consistent or equivalent configurations, the consistency may also be logged or recorded in a data store, or otherwise reported to one or more other systems. Additionally, where a comparison of configuration data between two systems indicates that the two systems have different configurations, and that a malfunction or security breach may have occurred, one or more alarms may sound, and one or more messages may be transmitted by either system to another system or to authorized personnel. Any number or type of steps may be taken to audit or further evaluate the inconsistency or inequivalence. Furthermore, where a solution to the inconsistency or inequivalence is readily apparent and available (i.e., where the inconsistency indicates that one of the systems features an inferior operating system, and that an upgrade to the operating system is available), one of the systems may automatically obtain and/or execute the solution to the inconsistency. In such a scenario, the peer analysis and configuration system of the present disclosure may be disabled as a solution is deployed, and reenabled once the installation of the solution has been confirmed. Where such a solution is neither apparent nor available (i.e., where it is unclear as to which of the systems is the cause of an inconsistency or which steps should be taken to address the inconsistency), one or more conflict resolution mechanisms may be utilized to analyze the inconsistency or inequivalence, and determine one or more causes of the inconsistency or inequivalence, or solutions thereto.

The systems and methods of the present disclosure may provide further advantages to a distributed computing or data processing system, which are currently favored for their lower cost, greater reliability, increased flexibility and improved performance and processing speeds with respect to localized or serial systems. The systems and methods disclosed herein may ensure that the distributed components of such systems are operating according to a single standard configuration, and may further identify any changes in configuration of any one of the components faster and more reliably than existing systems or methods. The systems and methods of the present disclosure may therefore operate even in view of a failure of one or more components of a networked system, and may identify any necessary modifications or configuration changes to the one or more systems outside of normal channels.

The systems and methods of the present disclosure may be utilized by any number of peer components of a networked system, according to any language or protocol. For example, the summaries or records of the states or configurations to be generated by an originating system, and requested from (or provided by) a receiving system, may be prepared in Extensible Markup Language (XML). Any other known computing languages or protocols may also be utilized in accordance with the systems and methods of the present disclosure.

The computing devices utilized by users in accordance with the present disclosure may include any of a number of computer-related machines that are capable of communicating over a network, including but not limited to set-top boxes, personal digital assistants, mobile telephones, digital media players, web pads, desktop computers, electronic book readers, and the like. Additionally, users of the systems and methods of the present disclosure may use any software, web-enabled or Internet applications operating on computing devices, or any other client-server applications or features including electronic mail (or E-mail), short or multimedia messaging service (SMS or MMS) text messages, or other messaging techniques to communicate with (or connect to) other such devices over a network. The protocols and components for providing communication between the respective components are well known to those skilled in the art of computer communications and thus, need not be described in more detail herein. Moreover, process steps described as being performed by certain components in accordance with the present disclosure may be automated steps performed by their respective computer systems or devices, or implemented within software modules (or computer programs) executed by one or more computer systems or devices. Specially designed hardware could, alternatively, be used to perform certain operations.

The data and/or computer executable instructions, programs, firmware, software and the like (also referred to herein as "computer executable" components) described herein may be stored on a computer-readable medium that is within or accessible by one or more computer components of a networked system, and may have sequences of data or code which, when executed by a processor (such as a central processing unit, or CPU), cause the processor to perform all or a portion of the functions and/or methods described herein. Such computer executable instructions, programs, software and the like may be loaded into the memories of the respective components using one or more drive mechanisms associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon content (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read only memories (EPROMs), electrically erasable programmable read only memories (EEPROMs), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure is generally directed to systems and methods for analyzing and enforcing the respective states or configurations of peers in a networked system. Preferably, the systems and methods disclosed herein are directed to preparing summaries, records or other files indicative of the respective configurations of each of the peers in the networked system; comparing two of the summaries, records or files to one another; and determining whether the configurations of the peers are consistent or equivalent to one another on the basis of the comparison. In some situations, the peers to be compared may be selected at random. In other situations, a single peer may analyze and confirm the configurations of each of the other peers in the networked system. In still other situations, a single peer may confirm the configuration of another peer, and that peer may then subsequently confirm the configurations of other peers in the networked system. Once a peer has been confirmed to be operating according to a desired or standard configuration, that peer may be used to determine whether other peers are operating in the desired or standard configuration.

For the purposes of illustration, some of the systems and methods disclosed herein may be referenced primarily in the context of servers or other computing devices in a networked system, such as the servers 110, 120, 130, 140 in the networked system 100 shown in FIG. 1. As will be recognized by those of skill in the art, however, the systems and methods disclosed herein may also be used in many other situations in a plurality of computing devices are functionally connected to one another and defined as peers, and are not limited to such a context.

Figure 2:
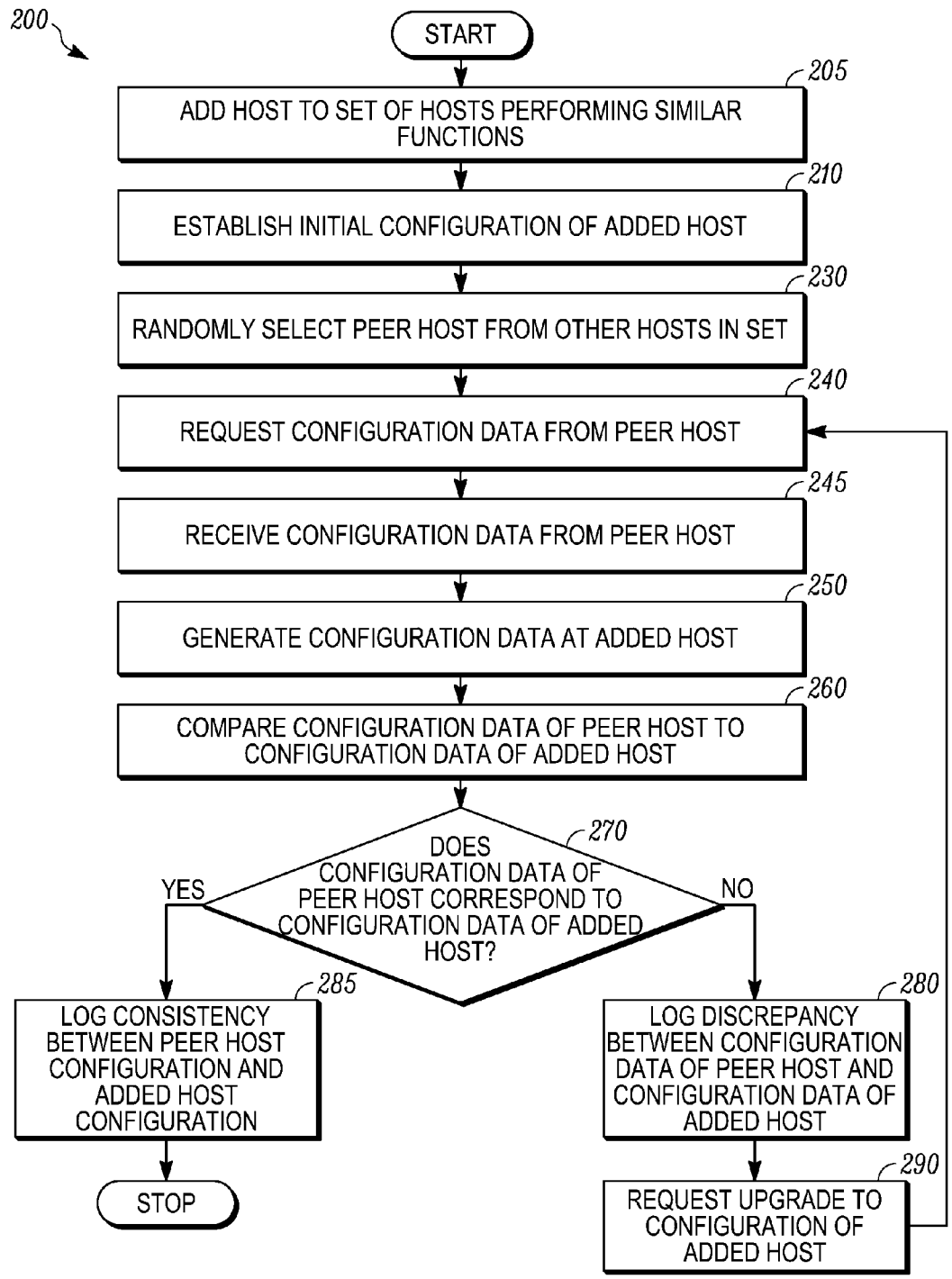
FIG. 2 is a flow chart of a process for analyzing and enforcing peer configurations, in accordance with embodiments of the present disclosure.

Referring to FIG. 2, a flow chart 200 representing one embodiment of a process for analyzing and enforcing peer configurations in accordance with embodiments of the present disclosure is shown. At step 205, a host is added to a set of other hosts that are devoted to performing similar services, and at step 210, an initial configuration of the added host may be established. For example, a new electronic mail server may be added to a corporation's existing mail servers, in order to expand the corporation's available capacity for sending, receiving and processing electronic messages. At step 230, at a predetermined time, a peer host may be randomly selected among the other hosts in the set, and at step 240, configuration data may be requested from the randomly selected peer host. For example, where a new electronic mail server is added to a set of existing mail servers, one of the existing mail servers may be selected at random for comparison to the newly added mail server, and the randomly selected server may be prompted to provide data regarding its current configuration (e.g., a version of a software application or operating system, a status of a data structure, a setting, a permission, etc.). The data requested of the randomly selected server may be of a particularly defined format, and the request may be made in any particular language (e.g., XML).

At step 245, the requested configuration data may be received from the randomly selected peer host, and at step 250, the newly added host may generate a similar set of configuration data regarding its own configuration. For example, where the newly added host requests a report of a version of a software application operating on the randomly selected host at step 240, the newly added host may generate the same report with respect to its own operating system.

At step 260, the newly added host may compare its own configuration data to that of the randomly selected peer host. At step 270, if the configuration data of the peer host corresponds to the configuration data of the newly added host, then the process advances to step 285, and the consistency between the configurations of the peer host and the newly added host is logged. If the configuration data of the peer host does not correspond to the configuration data of the newly added host, then the process advances to step 280, where the discrepancy between the configuration data is logged, and to step 290, where an upgrade to the configuration of the added host is requested. Once the configuration of the added host has been updated, the process confirms the update to the configuration by returning to step 240, where configuration data is requested from the peer host. The process will repeat steps 240, 245, 250, 260 and 270, as necessary, until a consistency between the peer host's configuration and the added host's configuration is determined.

Accordingly, the systems and methods of the present disclosure may be utilized when installing a new host alongside other peers, i.e., upon installing a new component in a subnet of a broader network, in order to analyze and modify the state or configuration of the new added host with respect to its peers. A set of configuration data regarding the new host may be compared to a similar set of configuration data regarding one of its peers to determine whether the new host and the peer are operating in a consistent or equivalent state or configuration. In such a manner, a new host may be added to a set of other peers, and placed in the same state or configuration as the other peers of the set quickly and effectively. Additionally, the implementation of a change in configuration may be checked or otherwise verified by any means, such as by performing a subsequent comparison of a summary of the changed configuration to a summary of the configuration standard in order to determine whether any errors have been encountered during the implementation of the change.

Moreover, although the timing of the analysis of the new host according to the process represented in the flow chart 200 of FIG. 2 was predetermined (i.e., the analysis is performed in accordance with a schedule), an analysis and/or modification of a state or configuration of one of a group of hosts occur at any time in accordance with the systems and methods of the present disclosure, such as at random, or instantaneously upon the addition of a new host to a set of hosts. Additionally, a host's peers may be determined or defined on any basis or for any reason. Furthermore, although the process represented in the flow chart 200 of FIG. 2 implies that the newly added host, and not the randomly selected peer host to which the newly added host is compared, would require a configuration change in the event of a discrepancy between the systems, such a discrepancy may be addressed in any manner, and the systems and methods of the present disclosure are not so limited. For example, the randomly selected peer host may require a configuration change, or the discrepancy may be based on a fault or event not related to the version of the operating system on either peer. Conflicts between the configurations of two or more peer systems may be appropriately addressed in any manner and by any means known to those of ordinary skill in the art, including through the use of one or more conflict resolution mechanisms.

Figure 3:
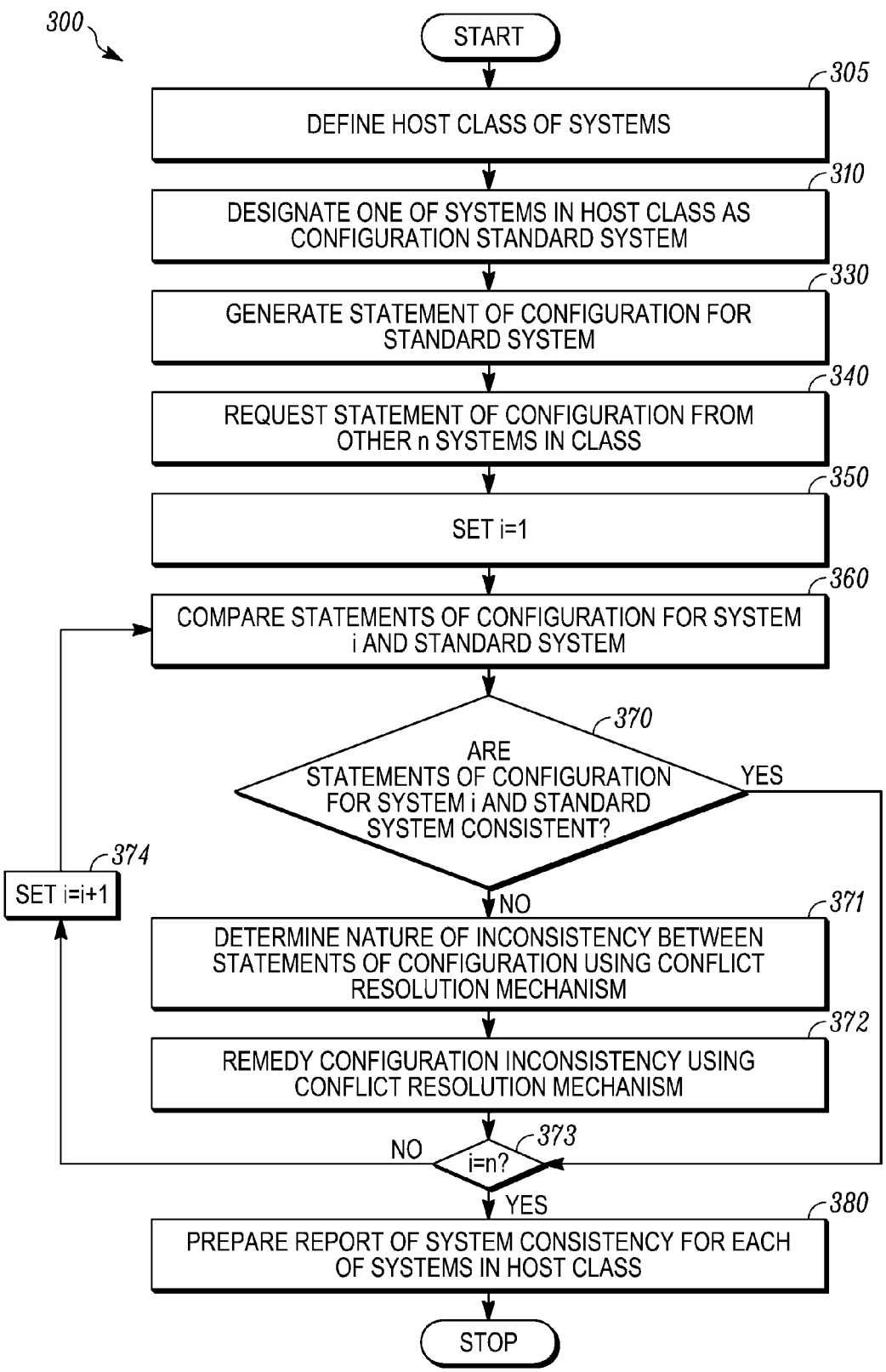
FIG. 3 is a flow chart of a process for analyzing and enforcing peer configurations, in accordance with embodiments of the present disclosure.

The systems and methods of the present disclosure may be utilized to analyze and enforce the configurations of each of a class of computer systems, beginning with a single randomly selected one of the systems. Referring to FIG. 3, a flow chart 300 representing another embodiment of a process for analyzing and enforcing peer configurations in accordance with the present disclosure is shown. At step 305, a host class of systems is defined, and at step 310, one of the systems in the host class is designated as the configuration standard for the host class. For example, where a plurality of computers, servers or other like devices perform a common or similar function or are located in a common location, a host class that includes each of the devices may be defined, and one of the devices may be designated as the standard to which each of the other devices may be compared.

At step 330, the standard system generates a statement of its configuration, and at step 340, the standard system requests a similar statement of configuration from each of the other n systems in the host class. For example, the system that has been designated as the configuration standard for the host class may determine its own configuration, e.g., the version of the operating software or specific set of source code operating thereon, and may transmit a broadcasted (or multicasted) message to each of the other systems in the host class, requesting that each of the systems provide the same information regarding the respective configurations of those systems.

At step 350, the value of a loop variable i is set at 1. At step 360, the statements of configuration that were generated by the standard system at step 330 and received from one of the other n systems, viz., system i, at step 340 are compared. At step 370, if the statements of configuration for system i and the standard system are not consistent with one another, then at step 371, the nature of the inconsistency between the configurations of the standard system and system i is determined, and at step 372, the inconsistency is remedied through a conflict resolution mechanism. For example, the statements of configuration may be inconsistent due to one of the systems having a different (i.e., older) version of an operating system software than the other. In such a situation, the conflict resolution mechanism may determine which of the two systems, if any, requires an upgrade to its operating system software, identify a source for the upgrade, and obtain the upgraded software for the system that requires it. Alternatively, the statements of configuration may be inconsistent due to a security breach at one or more of the systems, and, in such a situation, the conflict resolution may determine which of the two systems experienced the breach.

Once the inconsistency between the configurations of the standard system and system i has been remedied, the process then advances to step 373, where it is determined whether any of the configurations of any of the other n systems has yet to be compared with the standard system, i.e., whether i=n. If the configurations of each of the other n systems in the class has been compared with the standard system, i.e., if i=n, then the process advances to step 380, where a report of the consistencies of each of the systems in the host class is prepared. If the configuration of at least one of the other n systems in the class has yet to be compared to the standard system, i.e., if i≠n, then the value of the loop variable i is incrementally increased to i+1 at step 374, and the process returns to step 340, where a statement of configuration is requested from another of the n systems in the host class.

If the statements of configuration of the standard system and system i are deemed consistent at step 370, then the process advances to step 373, where it is determined whether the configurations of any of the other n systems has yet to be compared with the standard system. If the configurations of each of the other n systems in the class has been compared with the standard system, i.e., if i=n, then the process advances to step 380, where a report of the consistencies of each of the systems in the host class is prepared. If the configuration of at least one of the other n systems in the class has yet to be compared to the standard system, i.e., if i≠n, then the process returns to step 340, where a statement of configuration is requested from another of the n systems in the host class.

Accordingly, the systems and methods of the present disclosure may be utilized to analyze and enforce the configurations of each of the respective systems within a host class by comparing the summaries of the respective configurations to one another. In the event that any discrepancies or inconsistencies between the configurations are identified, a conflict resolution mechanism may determine the most appropriate resolution for the inconsistency and ensure that the solution is executed.

The process represented in the flow chart 300 of FIG. 3 may be utilized to compare the configuration of a single host within a host class to the configurations of each of the other hosts within the host class. For example, referring to FIG. 4, a networked system 400 for analyzing and enforcing peer configurations in accordance with embodiments of the present disclosure. The networked system 400 has a plurality of hosts 410, 430, 432, 434, 440, 442, 444.

Figure 4:
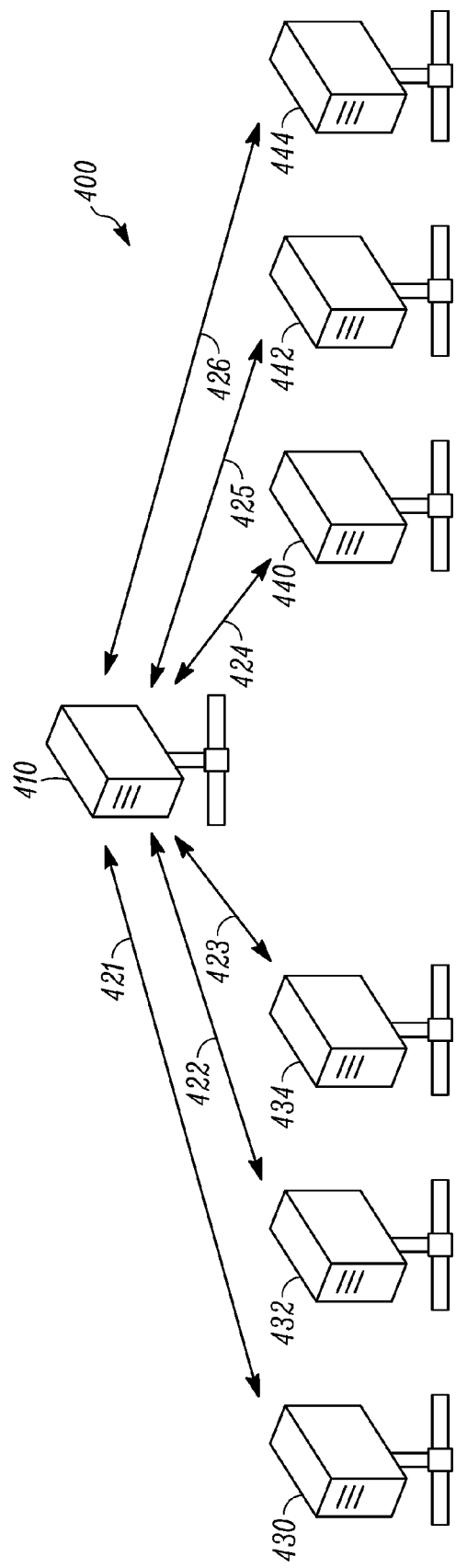
FIG. 4 is a networked system for analyzing and enforcing peer configurations, in accordance with embodiments of the present disclosure.

As is shown in FIG. 4, the host 410 may be designated as a configuration standard, and may engage each of the other hosts 430, 432, 434, 440, 442, 444 in the host class in a comparison of their respective configurations, in series, in accordance with the process represented in the flow chart 300 of FIG. 3 or any other embodiment of the present disclosure. For example, the host 410 may transmit one or more messages to or from the host 430, as indicated by line 421, and request that the host 430 prepare and provide a summary of its current configuration (i.e., "pull" the summary of the configuration from the host 430) before comparing the summary of the configuration of the host 430 to a summary of its own current configuration in order to determine whether the configurations of the two hosts 410, 430 are equivalent. Alternatively, the host 410 may transmit one or more messages including a summary of its current configuration to the host 430 (i.e., "push" the summary of its current configuration to the host 430) and instruct the host 430 to compare the summary to a summary of the configuration of the host 430, in order to determine whether the configurations of the two hosts 410, 430 are equivalent. Next, once the configuration of the host 430 has been analyzed, the host 410 may then transmit or receive one or more messages to or from hosts 432, 434, 440, 442, 444, as is indicated by lines 422, 423, 424, 425, 426 and request that the hosts 432, 434, 440, 442, 444 prepare and provide summaries of their current configurations. The host 410 may then compare the summary of its current configuration to those of the hosts 430, 432, 434, 440, 442, 444 until each of the hosts' configurations have been compared and confirmed with respect to host 410.

Additionally, according to the systems and methods of the present disclosure, after a configuration of one of the other hosts has been determined to be equivalent with the configuration standard, that host may then serve as a configuration standard, and its configuration may then be compared to the configuration of another host in order to determine whether that other host's configuration is equivalent with the configuration standard. Therefore, in such a manner, the summaries of the respective configurations may be compared to one another in a cascading manner, until it has been determined that each of the hosts is in a configuration that has been confirmed as consistent with the configuration standard. Referring to FIG. 5A, a networked system 500 for analyzing and enforcing peer configurations, in accordance with embodiments of the present disclosure, is shown. The networked system 500 includes a single host 510 and two additional groups 512, 514 of hosts 530, 532, 534, 540, 542, 544.

The host 510 may compare its configuration to the configuration of one of the hosts in each of the groups 512, 514. As is shown in FIG. 5A, the host 510 may compare its configurations to that of host 532 in group 512, and to that of host 542 in group 514. Once the configurations of hosts 532, 542 have been confirmed to be equivalent to the configuration of the host 510, then the host 532 may compare its configuration to those of the other hosts 530, 534 in group 512, and the host 534 may compare its configuration to those of the other hosts 540, 544 in the group 514.

Accordingly, the systems and methods of the present disclosure may be utilized to quickly and efficiently confirm the configurations of each of the respective systems in a cluster or group of systems in multiple ways. For example, referring to the networked system 400 shown in FIG. 4, which includes seven hosts 410, 430, 432, 434, 440, 442, 444, the configuration of a standard system 410 may be compared to the configurations of each of the other systems 430, 432, 434, 440, 442, 444 in series, in order to confirm that each of the hosts in the host class is operating a consistent configuration.

Alternatively, once a host has been determined to be in a configuration that is consistent with a known standard, a summary of the configuration of that host may then be compared to summaries of the configurations of other hosts, in order to determine whether such other hosts are also in a configuration that is consistent with the known standard, i.e., a host having a configuration that is consistent or equivalent with a known standard may act as a basis for subsequent comparisons with other hosts. For example, as is discussed above, referring to the networked system 500 shown in FIGS. 5A and 5B, a single system 510 may be designated as a configuration standard, and the remaining systems 530, 532, 534, 540, 542, 544 may be divided in to groups 512, 514 consisting of three systems each. Once the configurations of one of the systems 532, 542 in each of the groups 512, 514 has been determined to be equivalent to the configuration standard, the configurations of the systems 532, 542 may then be compared to the other systems 530, 534, 540, 544 in the groups 512, 514, which may be defined on any basis and for any reason (e.g., at random or on a functional basis).

Therefore, according to some embodiments of the present disclosure, such as the networked system 500 shown in FIG. 5A and FIG. 5B, once a host has been determined to be operating in a configuration that is consistent with a known configuration standard, a summary of that host's configuration may be compared to summaries of other hosts' configurations, in order to determine whether those hosts are operating in configurations that are consistent with the known configuration standard, in a cascading manner and in parallel, which may be faster and more efficient than embodiments such as the networked system 400 shown in FIG. 4. Rather than using a summary of a single host to determine whether each of the other hosts in a host class is operating in a consistent configuration with a configuration standard, in series, such as is shown in FIG. 4, summaries of multiple, respective hosts that have already been confirmed as having configurations that are consistent with the configuration standard may be utilized to confirm whether the remaining hosts in the host class also have configurations that are consistent with the configuration standard.

Figure 6:
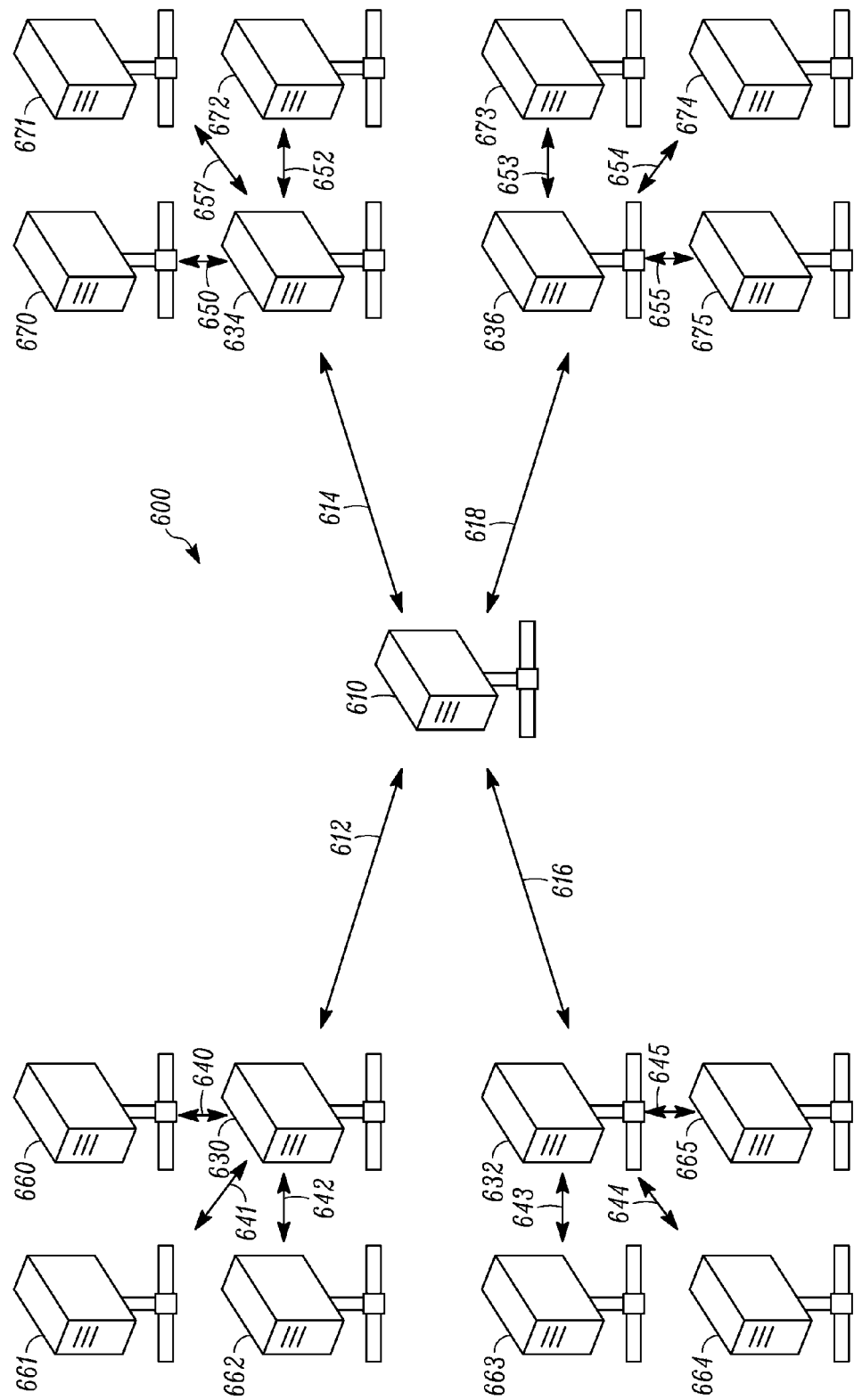
FIG. 6 is a networked system for analyzing and enforcing peer configurations, in accordance with embodiments of the present disclosure.

The size of a fleet or class of hosts that may have their configurations compared and confirmed to be consistent with a configuration standard and the number of groups into which a fleet or class may be divided in such a manner is not limited. Referring to FIG. 6, a networked system 600 including seventeen hosts 610, 630, 632, 634, 636, 660, 661, 662, 663, 664, 665, 670, 671, 672, 673, 674, 675 is shown. The configurations of each of the systems in the networked system 600 may be analyzed to determine whether they are consistent with one another in a series of steps. First, the host 610 may compare a summary of its configuration to summaries of the configurations of hosts 630, 632, 634, 636. Second, once the configurations of the hosts 630, 632, 634, 636 have been confirmed to be consistent with the configuration of the host 610, the configurations of those hosts 630, 632, 634, 636 may be compared to other hosts in the networked system 600. Specifically, the configuration of the host 630 may be compared to the configurations of the hosts 660, 661, 662, and the configuration of the host 632 may be compared to the configurations of the hosts 663, 664, 665. Likewise, the configurations of the hosts 634 and 636 may be compared to the configurations of the hosts 670, 671, 672 and the hosts 673, 674, 675, respectively.

In such a manner, the systems and methods of the present disclosure do not rely on a single, original host (viz., host 610) to determine whether each of the sixteen other hosts in the host class is operating in a configuration that is consistent with that original host. Instead, hosts that have been confirmed to be operating in configurations that are consistent with the original host may also be used to determine whether other hosts are operating in configurations that are consistent with the original host. The status of the configurations of each of the hosts in the host class may thus be analyzed and confirmed more quickly and efficiently than if a single host was relied upon as the lone configuration standard.

As is discussed above, the systems and methods of the present disclosure may confirm that the peers of a host class are operating in the same configuration by comparing summaries of the configurations of hosts to those of their peers. Where a networked system includes a fleet of hosts assigned to host classes that are proper subsets of the fleet (i.e., where not all of the hosts in the fleet belongs to the same host class, or where a component is added to a subnet of a broader network), the systems and methods of the present disclosure may be utilized to confirm that each of the hosts in the fleet is operating according to a common configuration. For example, according to one embodiment, a host may "pull" a summary of the configuration of another host, and compare the summary of that host's configuration to a summary of its own configuration. Conversely, according to another embodiment, a host may "push" a summary of its configuration to another host, and request that the other host compare the summary to a summary of its own configuration.

Figure 7:
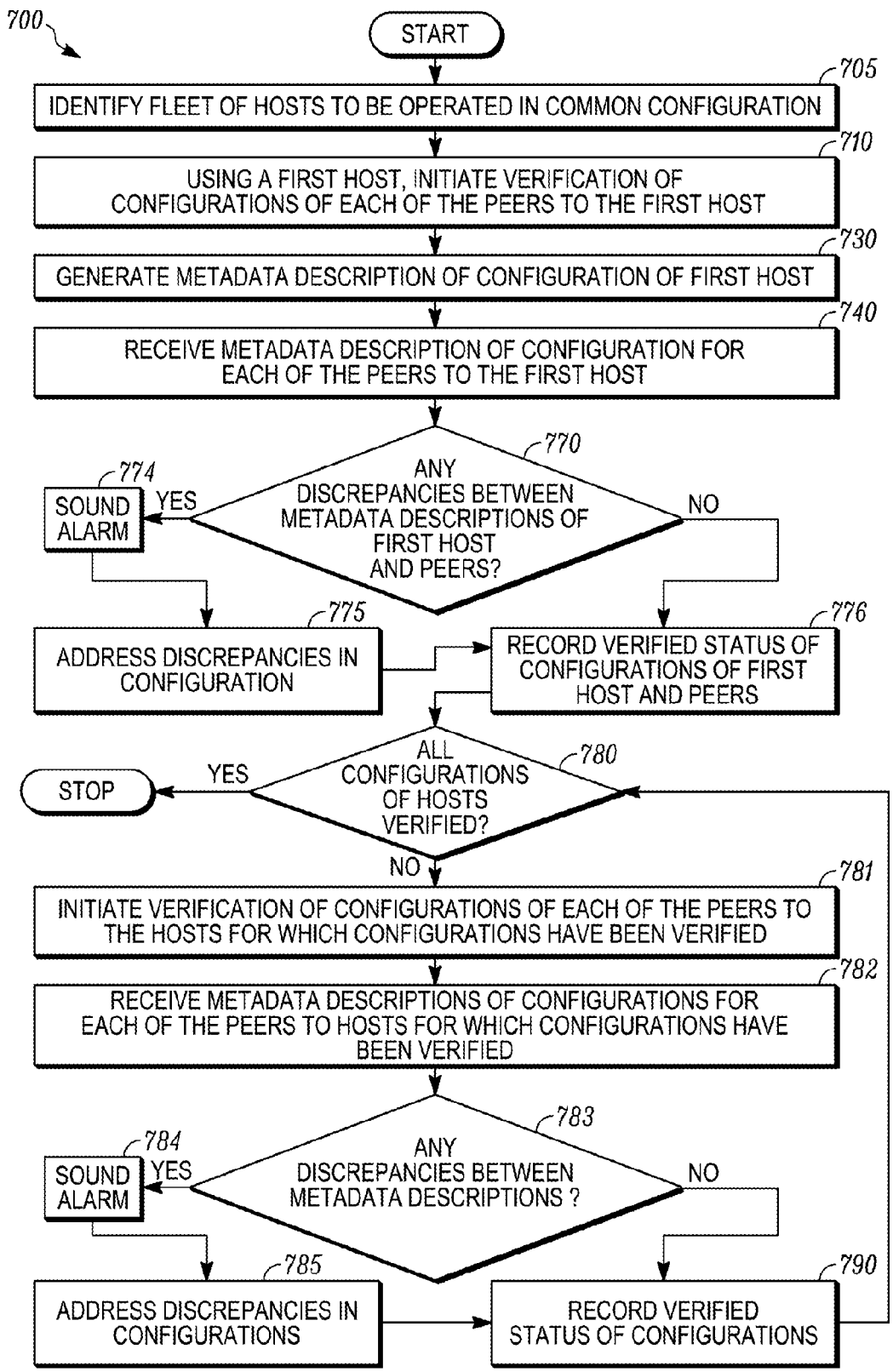
FIG. 7 is a flow chart of a process for analyzing and enforcing peer configurations, in accordance with embodiments of the present disclosure.

Referring to FIG. 7, a flow chart 700 representing one embodiment of a process for analyzing and enforcing peer states or configurations in accordance with embodiments of the present disclosure is shown. At step 705, a fleet of hosts that are intended to be operated in a common configuration is identified, and at step 710, a first host may initiate a verification of the configurations of each of its peers. At step 730, the first host may generate a metadata description of its own configuration, and at step 740, the first host may receive metadata descriptions of the configurations of each of its peers. For example, referring to the networked system 600 of FIG. 6, which includes seventeen hosts, the first host 610 may have hosts 630, 632, 634, 636 as its peers, and may prepare a summary of the software applications operating thereon in a single file or in a suite of files, and also receive a similar file or files containing summaries of the software applications operating on its peer hosts 630, 632, 634, 636, which may be independently generated by the respective systems.

At step 770, it may be determined whether there are any discrepancies between metadata descriptions of the first host and any of its peers. If there are no such discrepancies, the peers of the first host are verified as operating in consistent configurations, then the process may advance to step 776, where the verified status of the configurations of the first host and its peers may be recorded. If there are any discrepancies between the metadata descriptions, however, then the process advances to step 774, where an alarm may be sounded, and to step 775, where the networked system may address any such discrepancies before advancing to step 776, where the verified status of the configurations of the first host and its peers may be recorded.

At step 780, it may be determined whether the all of the hosts' configurations in the fleet have been verified. If so, then the process ends. If not, then at step 781, each of the peers of the first host for which the configurations were confirmed at steps 770-776 may then initiate a verification of the configurations of its own peers. For example, referring again to the networked system 600 of FIG. 6, once the configurations of the hosts 630, 632, 634, 636 have been confirmed to be consistent with the configuration of the host 610, the configurations of the hosts 630, 632, 634, 636 may then be utilized to determine whether other hosts 660, 661, 662, 663, 664, 665, 670, 671, 672, 673, 674, 675 in the group are also operating in a consistent configuration. At step 782, the hosts that have been verified as having consistent configurations may then receive metadata descriptions of their peers' configurations.

At step 783, if there are any discrepancies between the metadata descriptions of the configurations of the hosts that have been confirmed to be consistent with the first host and those of their peers, then an alarm may be sounded at step 784, and the discrepancies in the configurations may be addressed at step 785. Once the discrepancies have been addressed, or if there are no such discrepancies, then the process advances to step 790, where the verified status of the configurations is recorded, and then to step 780, where it is determined whether the configurations of all of the hosts in the fleet have been confirmed. If there are any remaining hosts in the fleet that have not had their configurations analyzed, then the process repeats itself until the configurations of each of the hosts in the fleet have been confirmed as consistent with the first host.

As is discussed above, the configurations of one or a predetermined number of systems in a class may be selected or otherwise identified as a standard configuration in which each of the systems in the class is preferably operated. A summary or description of the standard configuration may then be compared to summaries or descriptions of configurations of each of the remaining systems in the class and, if necessary, one or more changes may be made to the systems in the class in order to ensure that each of the systems is operating according to the standard configuration. Therefore, the proper selection of a configuration as the standard configuration is critical for ensuring that each of the systems in the class is ultimately operating in the preferred configuration.

Figure 8:
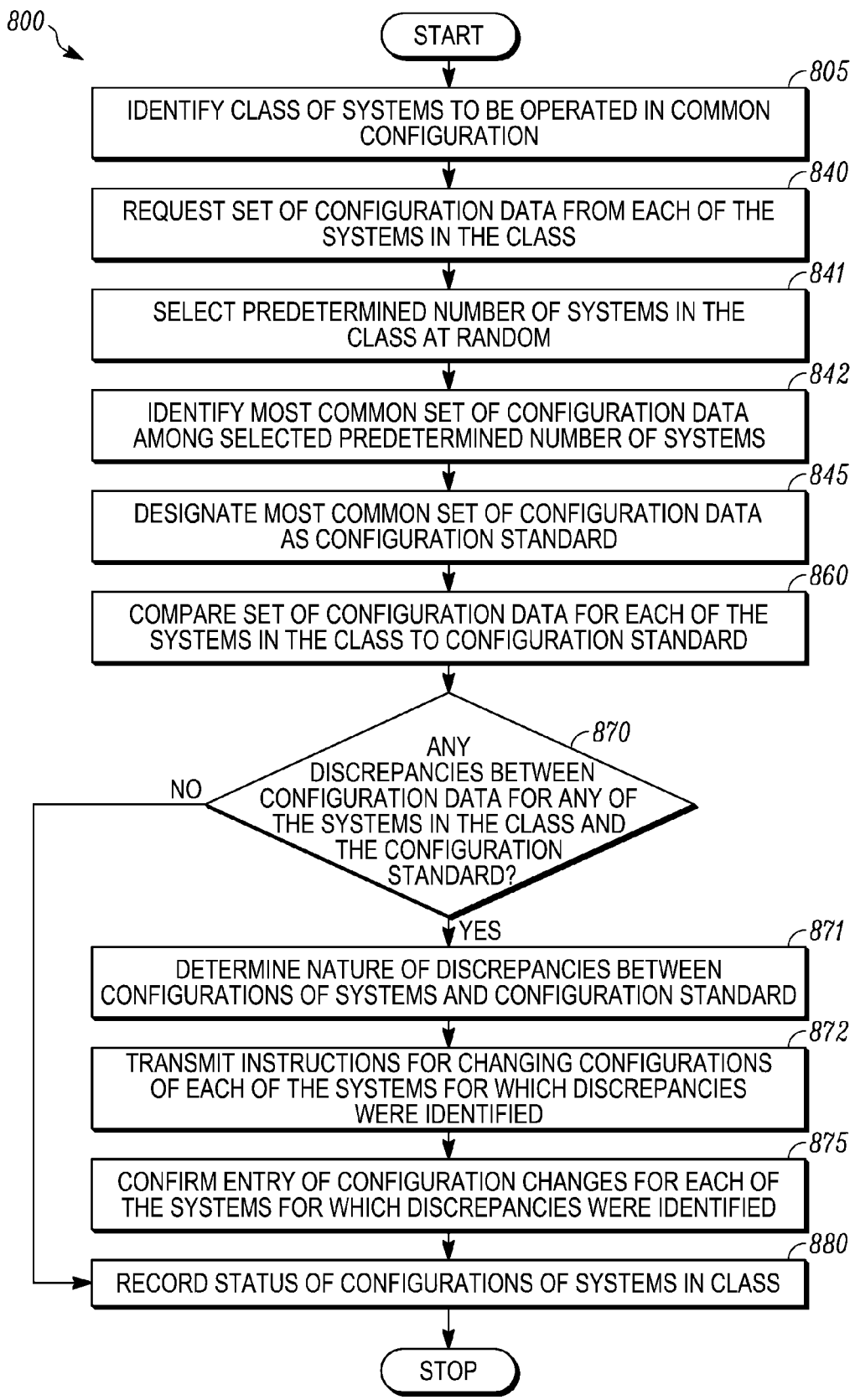
FIG. 8 is a flow chart of a process for analyzing and enforcing peer configurations, in accordance with embodiments of the present disclosure.

One system in a class may be designated as a configuration standard in any number of ways, such as by polling some or all of the systems of the class for summaries or descriptions of their configurations and by designating the most common configuration among the systems as the configuration standard for the class. Referring to FIG. 8, a flow chart 800 representing one embodiment of a process for analyzing and enforcing peer states or configurations in accordance with embodiments of the present disclosure is shown. At step 805, a class of systems that is to be operated in a common configuration is identified, and at step 840, sets of configuration data are requested from each of the systems in the class. For example, each of the systems may be asked to provide a summary of its current data structures, software applications or security settings currently operating thereon.

At step 841, a predetermined number of the systems in the class may be selected at random. At step 842, the most common configuration among the predetermined number of the systems may be identified based on the sets of configuration data provided by those systems, and at step 845, the most common set of configuration data may be identified as the configuration standard for the class. For example, where five systems in a class of systems are selected at random, if three of the systems are operating in the same configuration and two of the systems are not, the configuration in which the three systems are operating may be identified as the configuration standard, and may serve as a basis for comparisons with each of the other systems in the class.

At step 860, the configuration data for the configuration standard identified at step 842 may be compared to the configuration data provided by each of the systems at step 840. At step 870, it is determined whether any discrepancies between the configuration data for the configuration standard and the configuration data for any of the other systems in the class exist. If there are no such discrepancies, then the process advances to step 880, where the status of the configurations of the systems in the class (i.e., that each of the systems in the class is operating according to the configuration standard) is recorded.

If any such discrepancies are identified at step 870, then the process advances to step 871, where the nature of the discrepancies is determined. For example, where a configuration is defined as including a data set, a version of a software application, and a permission level of a particular system, the process determines which aspect of a system's configuration is inconsistent with that of the configuration standard. Once the inconsistent aspect (or aspects) of the configurations are determined, at step 872, instructions for changing the configurations are transmitted to the systems that have been identified as having discrepancies with the configuration standard. At step 875, the entry of the changes to the configurations is confirmed, and at step 880, the status of the configurations of the systems in the class (i.e., that each of the systems in the class is operating according to the configuration standard) is recorded.

Accordingly, a configuration standard may be selected in any manner and on any basis, such as by polling a quorum of the systems in a fleet or class and identifying the configuration in which a majority of the systems is operating, and by comparing a summary or description of that configuration to summaries or descriptions of the configurations of the other systems in the fleet or class, as is described in the flow chart 800 of FIG. 8. Other variants of the polling or quorum-based selection of a configuration standard may also be used. For example, when polling a predetermined number of the systems in a class for their respective configurations, such as in steps 841 and 842 of the flow chart 800 shown in FIG. 8, a threshold number or percentage of the predetermined number of systems may be defined, such that a configuration standard may be designated only if the number or percentage of systems operating in a single configuration exceeds the threshold. If the threshold is not exceeded, then a configuration standard may be selected from the predetermined number of systems at random, or another quorum of systems may be polled. Alternatively, where the threshold number is not exceeded, an aggregate configuration may be defined based on the most recent or most optimal aspects of the individual configurations of the respective systems that have been polled.

Figure 9:
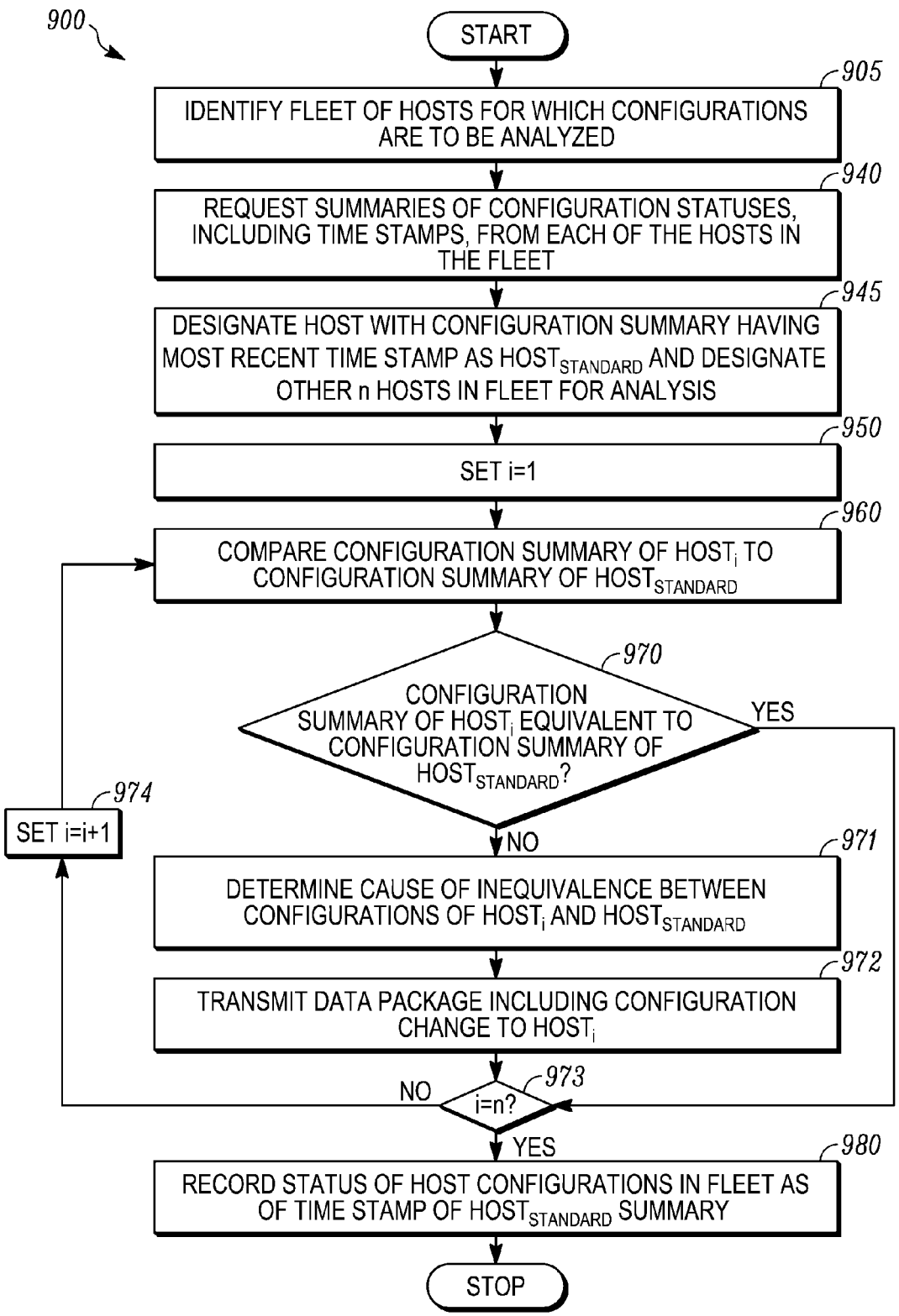
FIG. 9 is a flow chart of a process for analyzing and enforcing peer configurations, in accordance with embodiments of the present disclosure.

One system in a class may be designated as a configuration standard in any number of ways, such as by polling some or all of the systems of the class for summaries of their configurations and by designating the most recent configuration among the systems as the configuration standard for the class. Referring to FIG. 9, a flow chart 900 representing one embodiment of a process for analyzing and enforcing peer states or configurations in accordance with embodiments of the present disclosure is shown. Except where otherwise noted, reference numerals preceded by the number "9" in FIG. 9 indicate steps that are similar to steps having reference numerals preceded by the number "3" shown in FIG. 3.

At step 905, a fleet of hosts for which the respective configurations are to be analyzed is identified, and at step 940, a summary of the configuration status and a time stamp associated with the configuration status may be requested from each of the hosts. For example, where a group of servers dedicated to performing a common function is operating a software application, each of the servers may provide a summary of the version of the software application and a time at which the software application was most recently updated.

At step 945, the host having the configuration summary with the most recent time stamp may be designated as the standard host, or $HOST_{STANDARD}$, and the other n hosts in the fleet may be designated for analysis. At step 950, the value of a loop variable i is set at 1, and at step 960, the configuration summary of a first one of the hosts, or $HOST_i$, is compared to the configuration summary of the standard host, or $HOST_{STANDARD}$. If the configuration summary of the first one of the hosts, or $HOST_i$, is equivalent to the configuration summary of the host standard, or $HOST_{STANDARD}$, at step 970, then the process advances to step 973, where it is determined whether each of the configurations of the n other hosts have been compared to the host standard, or if i=n. If the configurations of any other hosts have not been compared to the host standard, i.e., if i≠n, then the value of the loop variable i is incrementally increased to i+1 at step 974, and the process returns to step 960, where a configuration summary of another one of the hosts, or $HOST_i$, is compared to the configuration summary of the standard host, or $HOST_{STANDARD}$.

If the configuration summary of the first one of the hosts, or $HOST_i$, is not equivalent to the configuration summary of the host standard, or $HOST_{STANDARD}$, then the process advances to step 971, where the cause of the inequivalence between the configurations is determined, and to step 972, where a data package including an appropriate configuration change is transmitted to the first one of the hosts, or $HOST_i$. At step 973, it is determined whether each of the configurations of the n other hosts have been compared to the host standard, or if i=n. If the configurations of any other hosts have not been compared to the host standard, i.e., if i≠n, then the value of the loop variable i is incrementally increased to i+1 at step 974, and the process returns to step 960.

Accordingly, as is set forth above, where the configurations of each of the systems or hosts in a fleet or class are to be analyzed and enforced according to the present disclosure, the system or host having the most recently updated configuration in the fleet or class may be designated as the configuration standard, and a summary of that configuration may be compared to summaries of the configurations of the other systems or hosts in the fleet or class. In addition to the polling or quorum-based selection of configuration standards shown in the flow chart 800 of FIG. 8, or the selection of the most recently updated configuration shown in the flow chart 900 of FIG. 9, any other means for designating a configuration standard may be used in accordance with the present disclosure. For example, where a configuration standard is to be defined by a system having the most recently updated configuration in a class, and the configurations of more than one system in the class were updated at the same time (i.e., the configuration updates have the same time stamps), the systems that updated their configurations at the same time may be polled, and the most common configuration among the group of systems that updated their configurations at the same time stamp may be selected as the configuration standard.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. While the present disclosure describes exemplary embodiments that may be associated with networked systems consisting of groups of servers, such as electronic mail servers, the systems and methods of the present disclosure are not so limited, and may be utilized in connection with any networked groupings of independent computer-based systems or methods.

It should be understood that, unless otherwise explicitly or implicitly indicated herein, any of the features, characteristics, alternatives or modifications described regarding a particular embodiment herein may also be applied, used, or incorporated with any other embodiment described herein. Moreover, with respect to the one or more methods or processes of the present disclosure described herein, including but not limited to the flow charts shown in FIGS. 2, 3 and 7, the order in which the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A computer-implemented method for maintaining a class of systems in a preferred configuration comprising:

defining the class of systems using at least one computer processor;

designating at least one of the systems in the class of systems as a configuration standard, either singly or jointly, using the at least one computer processor, wherein the at least one of the class of systems has the preferred configuration;

generating, in response to the designating the at least one of the systems in the class of systems as the configuration standard, a statement of a configuration of the configuration standard using the at least one computer processor, wherein the statement of the configuration of the configuration standard comprises an indicator of a set of data residing on the configuration standard and an indicator of a version of at least one software application operating on the configuration standard;

receiving, from a first one of the class of systems over a network, a statement of a configuration of the first one of the class of systems, wherein the statement of the configuration of the first one of the class of systems comprises an indicator of a set of data residing on the first one of the class of systems and an indicator of a version of at least one software application operating on the first one of the class of systems, and wherein the first one of the class of systems is not the configuration standard;

comparing the statement of the configuration of the configuration standard to the statement of the configuration of the first one of the class of systems using the at least one computer processor;

determining that the statement of the configuration of the configuration standard is not equivalent to the statement of the configuration of the first one of the class of systems; and transmitting a data package comprising a configuration change to at least one of the configuration standard or the first one of the class of systems.

2. The computer-implemented method of claim 1, wherein the data package comprises at least one of an upgraded set of source code, an upgrade to the at least one software application, a registry key, a change in a setting or a level of permission.

3. The computer-implemented method of claim 1, further comprising:

receiving, from a second one of the class of systems, a statement of a configuration of the second one of the class of systems, wherein the statement of the configuration of the second one of the class of systems comprises an indicator of a set of data on the second one of the class of systems and an indicator of a version of operating software on the second one of the class of systems, and wherein the second one of the class of systems is not the configuration standard;

comparing the statement of the configuration of the configuration standard to the statement of the configuration of the second one of the class of systems; and determining that the statement of the configuration of the configuration standard is not equivalent to the statement of the configuration of the second one of the class of systems; and transmitting a data package comprising a configuration change to at least one of the configuration standard and the second one of the class of systems.

4. A computer-implemented method comprising:

defining a host class using at least one computer processor, wherein the host class comprises a plurality of hosts;

designating a first host in the host class as a configuration standard using the at least one computer processor;

generating, at the first host, a metadata description of a configuration of at least the first host using at the least one computer processor;

transmitting, from the first host to a second host, a request for a metadata description of a configuration of the second host over a network, wherein the second host is a peer of the first host;

receiving, at the first host, the metadata description of the configuration of the second host;

comparing, at the first host, the metadata description of the configuration of at least the first host to the metadata description of the configuration of the second host using the at least one computer processor;

determining that the metadata description of the configuration of at least the first host is inequivalent to the metadata description of the configuration of the second host; and transmitting a data package comprising a change to at least one of the configuration of at least the first host or the configuration of the second host.

5. The computer-implemented method of claim 4, wherein designating the first host in the host class as the configuration standard further comprises:

selecting the first host at random from the plurality of hosts in the host class using the at least one computer processor, wherein the plurality of hosts includes at least the first host and the second host, and wherein each host of the plurality of hosts is a peer of at least one other host of the plurality of hosts.

6. The computer-implemented method of claim 4, wherein designating the first host in the host class as the configuration standard further comprises:

requesting a time associated with a configuration of each of a plurality of hosts in a host class; and selecting the one of the plurality of hosts in the host class having a most recent time associated with the configuration, wherein the selected one of the plurality of hosts in the host class is the first host.

7. The computer-implemented method of claim 4, wherein designating the first host in the host class as the configuration standard further comprises:

requesting a time associated with a configuration of each of the plurality of hosts in the host class; and selecting the one of the plurality of hosts in the host class having a time associated with the configuration corresponding to a predetermined time, wherein the selected one of the plurality of hosts in the host class is the first host.

8. The computer-implemented method of claim 4, further comprising:

determining a configuration of each of a predetermined number of the plurality of hosts in the host class;

identifying a most common configuration among the predetermined number of hosts; and selecting one of the predetermined number of hosts having the most common configuration, wherein the selected one of the predetermined number of hosts is the first host.

9. The computer-implemented method of claim 4, further comprising:

selecting the second host at random from the plurality of hosts in the host class using the at least one computer processor, wherein the plurality of hosts includes at least the first host and the second host, and wherein each host of the plurality of hosts is a peer of at least one other host of the plurality of hosts.

10. The computer-implemented method of claim 4, further comprising:

receiving a metadata description of a configuration of each of the plurality of hosts, wherein the configuration of each of the plurality of hosts comprises a predetermined number of aspects with respect to the configuration of the respective one of the plurality of hosts;

identifying a preferred one of each of the predetermined number of aspects based at least in part on the metadata descriptions of the configurations of the plurality of hosts; and defining an aggregate configuration based at least in part on the preferred aspects, wherein the configuration of at least the first host is the aggregate configuration.

11. The computer-implemented method of claim 4, further comprising:

determining a cause of an inequivalence between the configuration of at least the first host and the configuration of the second host using the at least one computer processor, and identifying the change to the at least one of the configuration of at least the first host or the configuration of the second host based at least in part on the cause of the inequivalence.

12. The computer-implemented method of claim 11, wherein determining the cause of the inequivalence between the configuration of at least the first host and the configuration of the second host comprises:

identifying a fault in one of the first host or the second host using a conflict resolution mechanism, and wherein the change to the at least one of the configuration of at least the first host or the configuration of the second host is an upgrade to the configuration of the one of the first host or the configuration of the second host in which the fault is identified.

13. The computer-implemented method of claim 12, wherein the fault is a security breach in one of the first host or the second host.

14. The computer-implemented method of claim 11, wherein identifying the change to the at least one of the configuration of at least the first host or the configuration of the second host comprises at least one of sounding an alarm or transmitting a message to one of the first host or the second host.

15. The computer-implemented method of claim 11, wherein the change to the at least one of the configuration of at least the first host or the configuration of the second host is at least one of an upgraded set of source code, an upgrade to the at least one software application, a registry key, a modification to a setting or a modification to level of permission.

16. The computer-implemented method of claim 4, wherein the host class is defined based at least in part on at least one of:
- a common location of the first host and the second host, or
- a common function performed by the first host and the second host.

17. The computer-implemented method of claim 4, wherein defining the host class further comprises:
- transmitting, from the first host, a message to each of the plurality of hosts in the host class, wherein each of the messages requests a confirmation as a peer of the first host; and
- receiving a response to the message from the plurality of hosts, wherein each of the responses includes the confirmation, and wherein the second host is one of the plurality of hosts, and
- wherein transmitting, from the first host to the second host, the request for the metadata description of the configuration of the second host further comprises:
- selecting the second host from the plurality of hosts based at least in part on the response to the message received from the second host using the at least one computer processor.

18. The computer-implemented method of claim 4, further comprising:
- installing an update to the configuration of the first host using the at least one computer processor,
- wherein transmitting the data package comprising the change to at least one of the configuration of at least the first host or the configuration of the second host further comprises:
- transmitting a message comprising the update from the first host to the second host.

19. The computer-implemented method of claim 4, further comprising:
- transmitting, from the first host to a third host, a request for a metadata description of a configuration of the third host over the network, wherein the third host is a peer of the first host;
- receiving, at the first host, the metadata description of the configuration of the third host;
- comparing, at the first host, the metadata description of the configuration of at least the first host to the metadata description of the configuration of the third host using the at least one computer processor;
- determining that the metadata description of the configuration of at least the first host is inequivalent to the metadata description of the configuration of the third host; and
- recording an inequivalence between the configuration of at least the first host and the configuration of the third host in the at least one data store.

20. The computer-implemented method of claim 4, further comprising:
- transmitting, from the second host to a third host, a request for a metadata description of a configuration of the third host over the network, wherein the third host is a peer of the second host;
- receiving, at the second host, the metadata description of the configuration of the third host;
- comparing, at the second host, the metadata description of the configuration of the second host to the metadata description of the configuration of the third host using the at least one computer processor;
- determining that the metadata description of the configuration of the second host is inequivalent to the metadata description of the configuration of the third host; and
- recording an inequivalence between the configuration of the second host and the configuration of the third host in the at least one data store.

21. The computer-implemented method of claim 4, further comprising:
- transmitting, from the second host to each of the plurality of hosts in the host class, a request for a metadata description of a configuration of the each of the plurality of hosts in the host class over the network, wherein each of the plurality of hosts in the host class is a peer of the second host;
- receiving, at the second host, a metadata description of a configuration of at least some of the plurality of hosts in the host class over the network;
- comparing, at the second host, the metadata description of the configuration of the second host to the metadata descriptions of each of the configurations of the at least some of the plurality of hosts using the at least one computer processor;
- determining that the metadata description of the configuration of the second host is inequivalent to at least one of the metadata descriptions of at least one of the configurations of the at least some of the plurality of hosts in the host class; and
- recording an inequivalence between the configuration of the second host and the at least one of the configurations of the at least some of the plurality of hosts in the at least one data store.

22. A networked computer system comprising a fleet of hosts,
- wherein each of the hosts in the fleet is a peer to at least one other host in the fleet, and
- wherein at least one of the hosts is adapted to execute a computer program causing the networked computer system to at least:
- select one of the hosts in the fleet as a standard host using at least one computer processor;
- define a first group of the hosts in the fleet, using the at least one computer processor, wherein the first group comprises at least two of the hosts in the fleet, other than the standard host;
- define a second group of the hosts in the fleet, using the at least one computer processor, wherein the second group of comprises at least two of the hosts in the fleet, other than the standard host;
- generate a record of a configuration of the standard host, using the at least one computer processor;
- request a record of a configuration of a first one of the hosts in the first group, wherein the first one of the hosts in the first group is a peer of the standard host;
- request a record of a configuration of a first one of the hosts in the second group, wherein the first one of the hosts in the second group is a peer of the standard host;
- compare the record of the configuration of the standard host to the record of the configuration of the first one of the hosts in the first group;
- if the record of the configuration of the standard host is equivalent to the record of the configuration of the first one of the hosts in the first group,
  - record an equivalency between the configuration of the standard host and the configuration of the first one of the hosts in the first group in a data store;

if the record of the configuration of the standard host is inequivalent to the record of the configuration of the first one of the hosts in the first group,
record an inequivalence between the configuration of the standard host and the configuration of the first one of the hosts in the first group in the data store;
compare the record of the configuration of the standard host to the record of the configuration of the first one of the hosts in the second group;
if the record of the configuration of the standard host is equivalent to the record of the configuration of the first one of the hosts in the second group,
record an equivalency between the configuration of the standard host and the configuration of the first one of the hosts in the second group in the data store; and
if the record of the configuration of the standard host is inequivalent to the record of the configuration of the first one of the hosts in the second group,
record an inequivalence between the configuration of the standard host and the configuration of the first one of the hosts in the second group in the data store.

23. The networked computer system of claim 22, wherein the computer program further causes the networked computer system to at least:
request a record of a configuration of a second one of the hosts in the first group;
request a record of a configuration of a second one of the hosts in the second group;
compare the record of the configuration of the first one of the hosts in the first group to the record of the configuration of the second one of the hosts in the first group;
if the record of the configuration of the first one of the hosts in the first group is equivalent to the record of the configuration of the second one of the hosts in the first group,
record an equivalency between the configuration of the first one of the hosts in the first group and the configuration of the second one of the hosts in the first group in a data store;
if the record of the configuration of the first one of the hosts in the first group is inequivalent to the record of the configuration of the second one of the hosts in the first group,
record an inequivalence between the configuration of the first one of the hosts in the first group and the configuration of the second one of the hosts in the first group in the data store;
compare the record of the configuration of the first one of the hosts in the second group to the record of the configuration of the second one of the hosts in the second group;
if the record of the configuration of the first one of the hosts in the second group is equivalent to the record of the configuration of the second one of the hosts in the second group,
record an equivalency between the configuration of the first one of the hosts in the second group and the configuration of the second one of the hosts in the second group in the data store; and
if the record of the configuration of the first one of the hosts in the second group is inequivalent to the record of the configuration of the second one of the hosts in the second group,
record an inequivalence between the configuration of the first one of the hosts in the second group and the configuration of the second one of the hosts in the second group in the data store.

24. The networked computer system of claim 22, wherein the computer program further causes the networked computer system to at least:
update the configuration of the standard host, wherein the updated configuration of the standard host comprises at least one of an upgraded set of source code, an upgrade to the at least one software application, a registry key, a change in a setting or a change in a level of permission.

25. The networked computer system of claim 22, wherein the computer program further causes the networked computer system to at least:
request a time associated with each of a plurality of the hosts in the fleet; and
select the one of the plurality of hosts in the fleet having the most recent time associated with the configuration,
wherein the selected one of the plurality of hosts in the fleet is the standard host.

26. The networked computer system of claim 22, wherein the computer program further causes the networked computer system to at least:
determine a configuration of each of a predetermined number of hosts in the fleet; and
determine a most common configuration among the predetermined number of hosts,
wherein the configuration of the standard host is the most common configuration, and
wherein the one of the hosts in the fleet selected as the standard host has the most common configuration.

* * * * *